United States Patent [19]

Niitsuma et al.

[11] Patent Number: 5,179,487
[45] Date of Patent: Jan. 12, 1993

[54] MAGNETIC RECORDING DISK LOADED IN A CARTRIDGE WITH A SPECIFIED LINER

[75] Inventors: Kazuhiro Niitsuma; Satoru Hayakawa, both of Kanagawa, Japan

[73] Assignee: Fuji Photo Film Co., Ltd., Kanagawa, Japan

[21] Appl. No.: 831,058

[22] Filed: Feb. 4, 1992

[30] Foreign Application Priority Data

Feb. 5, 1991 [JP] Japan ................. 3-35297

[51] Int. Cl.$^5$ .................. B65D 85/30; G11B 23/03
[52] U.S. Cl. ........................ 360/133; 206/444; 428/694; 428/695; 428/900; 428/64; 428/65
[58] Field of Search ............... 428/694, 695, 900, 64, 428/65; 360/133; 206/444, 313

[56] References Cited

U.S. PATENT DOCUMENTS

| | | | |
|---|---|---|---|
| 4,695,912 | 9/1987 | Moriwaki | 360/133 |
| 4,709,816 | 12/1987 | Matsumoto et al. | 206/444 |
| 4,812,938 | 3/1989 | Rogers et al. | 360/133 |
| 4,845,583 | 4/1989 | Zimmerman et al. | 360/133 |
| 5,051,287 | 9/1991 | Yamada et al. | 428/64 |

Primary Examiner—Paul J. Thibodeau
Assistant Examiner—Stevan A. Resan
Attorney, Agent, or Firm—Sughrue, Mion, Zinn, Macpeak & Seas

[57] ABSTRACT

A magnetic recording disk is disclosed which comprises a flexible magnetic disk comprising a nonmagnetic support having thereon a magnetic layer comprising ferromagnetic powders and binders which is rotatably loaded in a cartridge having a liner formed with a nonwoven fabric on the inside of the cartridge, wherein said liner comprises (A) two layers of a layer of the magnetic layer side comprising a nonwoven fabric of a mixed yarn of rayon fibers and polyester fibers formed on the side which contacts with the magnetic layer, and a layer of the cartridge side comprising a nonwoven fabric of acrylic fibers formed on the side which contacts with the cartridge; or (B) three layers of two layers comprising a nonwoven fabric of a mixed yarn of rayon fibers and polyester fibers, and an inter layer comprising acrylic fibers formed between the two layers.

6 Claims, 1 Drawing Sheet

MAGNETIC RECORDING DISK LOADED IN A CARTRIDGE WITH A SPECIFIED LINER

FIELD OF THE INVENTION

The present invention relates to a magnetic recording disk comprising a disk cartridge case (hereinafter referred to as "cartridge case") having a liner on the inside comprising a nonwoven fabric and a flexible magnetic disk rotatably loaded in the cartridge case. Specifically, the present invention relates to a magnetic recording disk having a liner, which is less susceptible to mold.

BACKGROUND OF THE INVENTION

A magnetic recording disk comprises mainly a cartridge case (i.e., cartridge or jacket) having a magnetic head-inserting gate and a hole for rotation-driving, a flexible magnetic recording disk rotatably loaded in the cartridge case and a liner provided on the inside of the above cartridge case.

A liner of a conventional magnetic recording disk comprises a nonwoven fabric made of a mixed yarn of a rayon fiber and a polypropylene fiber, a polyethylene terephthalate fiber, a mixed yarn of an acrylic fiber and a polyester fiber, or a mixed yarn of an acrylic fiber and a rayon fiber. The liner is fixed on the inside of the cartridge case, for example, by heat fusion and an adhesive.

In general, the flexible magnetic disk has on one side or both sides of a nonmagnetic support of polyester film or the like, a magnetic layer formed by coating on the support a magnetic coating solution prepared by dispersing and mixing a binder, a dispersant, a lubricant and an abrasive in an organic solvent, or by directly depositing a ferromagnetic metal by vacuum deposition. Further, the discoid magnetic recording medium comprises mainly a cartridge case having a magnetic head-inserting gate and a hole for rotation-driving and has a liner for supporting the magnetic recording medium.

Binders for a magnetic recording medium include synthetic resins such as a copolymer of vinyl chloride, vinyl acetate and vinyl alcohol, a polyurethane resin, a polyester resin, a cellulose derivative, a synthetic rubber type resin, an epoxy resin, an isocyanate type resin, and an acrylic type resin.

Further, the above magnetic layer may contain various additives such as a dispersant, a lubricant and an antistatic agent. These additives are usually various organic compounds such as, for example, fatty acids and their derivatives (fatty acid esters, fatty acid metal salts and fatty acid amides), aliphatic ethers, aliphatic alcohols, and aliphatic ketones as well as compounds having a saturated or unsaturated hydrocarbon group.

The materials for the liner are natural and synthetic fibers such as cellulose, rayon, polypropylene, polyethylene terephthalate, polyacrylic ester, and nylon. Mixed and impregnated into these fibers are each of a dispersant, a smoothing agent and an antistatic agent in an amount of each component of from 0.1 to 0.5% by weight. The above mixed solution is known as an oil solutions such as polyoxyethylene, glycol fatty acid ester and sodium alkylsulfuric acid ester. A nonwoven fabric is formed from the fibers singly or in combination, and the nonwoven fabric thus prepared is used in a single layer or a multilayer.

However, the compounds present in the binder and various additives contained in the magnetic layer are the nutritive sources for molds.

These substances help molds to grow on the surface of the medium in the high humidity. These molds are deposited on the surface of the disk and are liable to create problems such as a dropout.

It is proposed in JP-A-61-241212 and JP-A-2-49217 (the term "JP-A" as used herein refers to a "published unexamined Japanese patent application") to add an antimold agent to a magnetic layer to prevent mold from growing on the magnetic recording disk. JP-A-62-252582, JP-A-62-281176, JP-A-61-258075 and JP-A-63-157876 propose improving the material of a liner. However, these techniques are insufficient to prevent molds in the high humidity. Further, there are no countermeasures, for example, for a running durability in the high humidity where ferromagnetic powder, as discussed below, is used for a high density recording.

To increase the recording density of the recording medium, the recording capacity must be increased from 1M to 4M and further to 10M. In order to attain an increase in recording capacity, ferromagnetic metal powders consisting mainly of Fe, Ni and Co and tabular hexagonal ferrite powders such as barium ferrite have been investigated as ferromagnetic powders used for the recording medium.

Ferromagnetic metal powders are suitable for a high density recording medium because of their excellent magnetic properties such as coercive force and saturation magnetization. The tabular hexagonal ferrite powders are advantageous because of the easiness in utilizing a vertical magnetization component of the magnetic layer due to an axis of easy magnetization existing in the direction vertical to the plate of the grains thereof. In combination with the above properties, the recording density can be further increased by using the ferromagnetic metal powders having a specific surface area of 30 $m^2/g$ or more and a crystallite size of 300 Å or less measured by an X-ray diffraction method and the tabular hexagonal ferrite powders having a specific surface area of 25 $m^2$ or more, a tabular ratio (tabular diameter/tabular thickness) of 2 to 6 and a grain length as small as 0.02 to 1.0 μm.

Usually, a liner comprising a nonwoven fabric, which is provided on the inside wall of a jacket (i.e., cartridge) for the purpose of cleaning and protecting the surface of a magnetic layer, protects the magnetic layer without scratching the surface thereof or increasing torque at whatever condition the magnetic recording disk is used. However, where ferromagnetic metal powders and tabular hexagonal ferrite powders each having a small grain size are used as described above in order to increase recording density of a magnetic recording disk, the magnetic layer sometimes is rubbed and scratched by the liner present between a jacket (i.e., a cartridge or a jacket) and the flexible magnetic disk. Further, where these powders are used in high humidity, torque sometimes is increased which prevents the disk from smoothly rotating.

The above problems cannot be sufficiently solved merely by incorporating abrasive particles and fatty acid esters into the magnetic layer, which have previously been carried out in order to improve the durability of the magnetic recording disk.

Further, with respect to the scratching of the magnetic layer, there are proposed primarily means for mechanically strengthening the layer quality of a magnetic layer, such as the method of improving the binder used for a magnetic layer as disclosed, for example, in JP-A-3-102618, JP-A-3-44818 and JP-A-3-63927; and the method of improving layer quality of a magnetic layer as disclosed in JP-A-3-309913, JP-A-3-150720 and JP-A-3-259466. These methods have been effective to some extent.

Furthermore, in order to increase the function of a liner, there are proposed the method of using a nonwoven fabric made of a mixed yarn of a polyester fiber and an acrylic fiber, or a mixed yarn of a polyester fiber and a rayon fiber as disclosed, for example, in JP-A-1-171176, JP-A-61-208685 and JP-A-1-199371; and the method of impregnating various lubricants into a liner as disclosed in JP-A-61-120386 and JP-A-61-120387.

Also, the method of providing a roughness on the surface of a liner is proposed as disclosed in JP-A-U-62-29678 and JP-A-U-62-22774 (the term "JP-A-U" as used herein refers to a "published unexamined Japanese utility model application").

A reduction in dust released by the liner itself and an excellent cleaning property (dust collecting) are required by the liner for reliability. Further, with respect to running durability, the liner must not scratch the surface of the magnetic layer of a magnetic recording disk and must not cause an increase in torque nor dropout in the high humidity. However, conventional liner materials cannot necessarily provide the best properties.

SUMMARY OF THE INVENTION

A first object of the present invention is to improve the storage stability of a magnetic recording disk in the high humidity by preventing the generating of molds.

A second object of the present invention is to prevent the deterioration of magnetic layer durability, which is liable to take place, for example, when ferromagnetic metal fine powders and hexagonal ferrite fine powders are used for high density recording.

Through various investigations, the present inventors have found that the prevention of the generation of molds can be achieved by using a nonwoven fabric liner made of an acrylic fiber and by improving (using a polyester fiber) the material of the liner on the side that contacts the magnetic disk. Further, the prevention of the deterioration of the magnetic layer durability can be achieved by using a mixed yarn of a rayon fiber and a polyester fiber for the liner on the magnetic layer side.

More particularly, the present invention provides a magnetic recording disk which comprises a flexible magnetic disk comprising a nonmagnetic support having thereon a magnetic layer comprising ferromagnetic powders and binders which is rotatably loaded in a cartridge having a liner formed with a nonwoven fabric on the inside of the cartridge, wherein said liner comprises (A) two layers of a layer of the magnetic layer side comprising a nonwoven fabric of a mixed yarn of rayon fibers and polyester fibers formed on the side which contacts with the magnetic layer, and a layer of the cartridge side comprising a nonwoven fabric of acrylic fibers formed on the side which contacts with the cartridge; or (B) three layers of two layers comprising a nonwoven fabric of a mixed yarn of rayon fibers and polyester fibers, and an inter layer comprising acrylic fibers formed between the two layers.

Further, in order to improve the running durability, preferably a fatty acid ester can be further added to the magnetic layer in an amount of 3 to 20 parts by weight per 100 parts by weight of a magnetic powder and an abrasive having a Moh's hardness of 6 or more can be further added to the magnetic layer in an amount of to 20 parts by weight per 100 parts by weight of a binder.

DETAILED DESCRIPTION OF THE INVENTION

The present invention will be explained below in detail.

One of the characteristics of the present invention is that a layer of an acrylic fiber is used for a liner provided in a cartridge case (i.e., a cartridge or a jacket) of a magnetic recording disk.

In a conventional liner consisting of, for example, a rayon/polyester mixed yarn, molds grow when the magnetic recording disk using such liner is stored, for example, in the high humidity of 23° C. and 95% RH, and the molds are transferred on the surface of a magnetic layer of a magnetic disk (a medium) as foreign matter (i.e., dust), which causes dropout. On the contrary, where a liner comprising an acrylic fiber is used for a magnetic recording disk, no molds grow during storage even in the high humidity as mentioned above.

The reason thereof is not clear but it is assumed that an acrylic acid monomer remaining in the acrylic fiber may contribute to the effect.

The direct contact of the acrylic fiber with the magnetic layer of the magnetic disk is liable to shave and scratch the surface of the magnetic layer because the acrylic fiber is very hard. Therefore, in the present invention, the liner structure having the acrylic fiber layer does not directly contact the magnetic layer. The mixed yarn made of a rayon fiber and a polyester fiber both of which have no possibility of scratching the surface of the magnetic layer is used for the liner layer contacting with the magnetic layer.

Figure 1:
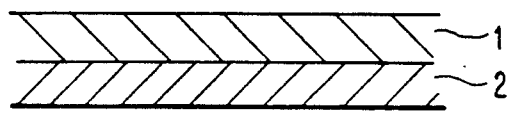
FIGS. 1 and 2 each are enlarged cross-sectional drawings showing the structures of the liners used in the present invention.
Figure 2:
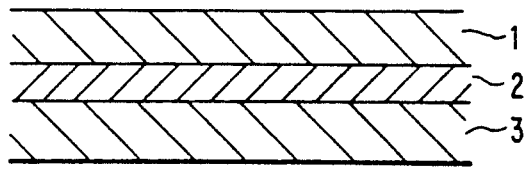

The attached drawings are enlarged cross-sectional drawings showing examples of the liner used in the present invention. FIG. 1 shows the liner comprising Layer 1 of a rayon/polyester mixed yarn and Layer 2 of an acrylic fiber. Layer 1 of the rayon/polyester mixed yarn is disposed in the cartridge case so that it contacts with the magnetic layer. FIG. 2 is an enlarged cross-sectional drawing showing another example of the liner used in the present invention. In this embodiment, the acrylic fiber Layer 2 is interposed between the rayon/polyester mixed yarn Layers 1 and 3, and the rayon/polyester mixed yarn Layer 1 is disposed on the side where it contacts the magnetic layer.

The thickness of the liner used in the present invention is preferably 100 to 400 μm and more preferably 160 to 290 μm, in which the thickness of the acrylic fiber layer may be preferably from about 10 to 390 μm and more preferably from 50 to 190 μm.

Even in such a two-layer structure or three-layer structure (a sandwich structure) in which the rayon/polyester mixed yarn layer is disposed on the side where it contacts with the magnetic layer (a medium), an antimold effect due to the acrylic fiber can be observed, and no molds grow on the magnetic recording disk even in the high humidity. Further, the magnetic layer is prevented from being scratched and thereby the running durability is improved because the relatively soft nonwoven fabric is disposed on the side where it contacts with the magnetic layer.

In the present invention, the incorporation of a fatty acid ester and an abrasive having a Moh's hardness of 6 or more into the magnetic layer can further improve the running property of the magnetic disk as was described above. The amount of fatty acid ester contained in the magnetic layer is preferably 3 to 20 parts by weight, more preferably 5 to 15 parts by weight, per 100 parts by weight of a ferromagnetic powder.

Too little amount of fatty acid contained in the magnetic layer makes the magnetic layer more susceptible to shaving in the high humidity. On the contrary, too much fatty acid plasticizes the binder to lower the layer quality, which deteriorates durability and increases torque in the high humidity.

Fatty acid esters prepared by condensing fatty acids having preferably 6 to 22 carbon atoms, more preferably 12 to 22 carbon atoms, with fatty alcohols having preferably 4 to 22 carbon atoms, more preferably 4 to 18 carbon atoms, can be used to lower the dynamic friction coefficient between a flexible magnetic disk and the liner and to stabilize running.

Too few carbon atoms in the above fatty acid ester sometimes makes the fatty acid ester more volatile and deteriorates the running property after storing over a long period of time. Too many carbon atoms in the fatty acid increases the viscosity thereof and deteriorates the running property, especially at a low temperature.

As long as the number of carbon atoms in the fatty acid ester falls within the above range, any fatty acid ester can be selected regardless of branching or linearity of the fatty acids and alcohols, the isomeric structure such as cis and trans, the number and branching position of alcohols, provided that the melting point is preferably 30° C. or less in order to provide the magnetic layer with a lubricating property under usual conditions.

As described above, too few carbon atoms in the fatty acid ester makes the fatty acid ester more volatile at a relatively high temperature. Exposure to high temperature for a long time creates the portion where an amount of fatty acid ester is partially reduced, and, therefore, the objects of the present invention cannot be sufficiently achieved.

On the contrary, too many carbon atoms increases the viscosity of the fatty acid ester, which causes sticking of the liner on the surface of the magnetic layer, which increases torque.

For the purpose of further increasing the effects of the present invention, it is effective to subject the liner to an embossing finish to form a roughness on the surface thereof. That is, the roughness formed on the surface of the liner with the embossing finish decreases the contact area with the magnetic layer to decrease the friction coefficient with the liner in the high humidity. Therefore, the increase in torque is suppressed, and the magnetic layer also is less liable to scratch.

Several methods of providing this embossing finish are available. In the calender rolling method, a nonwoven fabric can be passed through between an embossing roll having a roughness on the surface thereof and a smoothing roll, which are heated, to provide a roughness on the surface of the nonwoven fabric. An embossing pattern can be changed by changing the pattern of the roughness provided on the surface of the embossing roll. In addition, the hot blast method and supersonic method are available.

The thickness of the liner in the magnetic recording disk of the present invention is preferably 100 to 400 $\mu$m, more preferably 120 to 300 $\mu$m. The thickness of the liner is defined by the average of the values measured at five points in the lateral direction by the compression elasticity tester based on JIS-L-1085 with the load of 6 g/cm$^2$ and 20 g/cm$^2$ and the area of 5 cm$^2$.

A mixed yarn of a rayon fiber and a polyester fiber is used for the material of the nonwoven fabric used for the liner provided on the inside surface of the cartridge of the magnetic recording disk of the present invention because it has a soft surface at least on the side where it contacts with the magnetic layer and is less liable to scratch the magnetic layer, as described above.

Because of the large moisture absorption rate thereof, a rayon fiber expands in the high humidity to increase the area contacting with the magnetic layer, which in turn results in not only increasing torque but also scratching the magnetic layer. Accordingly, in the nonwoven fabric used for the liner of the magnetic recording disk of the present invention, the rayon fiber is not used alone but is mixed with a polyester fiber having a low moisture absorption rate, wherein the rayon fiber is mixed in the ratio of preferably 30% by weight or more, more preferably 45% by weight or more in the mixed yarn of the rayon fiber and polyester fiber.

A polyester fiber is used as the fiber mixed with the rayon fiber because the polyester fiber has very low moisture absorption rate. Additionally, an acrylic fiber, a nylon fiber and a polypropylene fiber may be mixed according to necessity.

The above rayon fiber used in the present invention is a viscose rayon fiber, a cupro-ammonium rayon fiber or an acetate rayon fiber. The rayon fiber (staple) preferably has a tensile strength of about 2.0 to 4.0 g/D, an extension percentage of about 12.to 28%, an extension elastic modulus (in 3% extension) of about 50 to 85%, an initial Young's modulus of about 400 to 950 kg/mm$^2$, and a specific gravity of about 1.50 to 1.52.

The polyester fiber used in the present invention is preferably a polyethylene terephthalate fiber prepared by polycondensation of terephthalic acid or dimethyl terephthalate and ethylene glycol. The polyester fiber (staple) preferably has a tensile strength of about 4.5 to 6.8 g/D, an extension percentage of about 20 to 50%, an extension elastic modulus (in 3% extension) of about 90 to 99%, an initial Young's modulus of about 310 to 870 kg/mm$^2$, and a specific gravity of about 1.37 to 1.39.

The acrylic fiber used in a single layer in the present invention preferably has a tensile strength of about 2.5 to 5.0 g/D, an extension percentage of about 25 to 50%, an initial Young's modulus of about 260 to 650 kg/mm$^2$, and a specific gravity of about 1.14 to 1.17.

The mixed ratio of the rayon fiber and the polyester fiber is preferably 30/70 to 95/5, more preferably 45/55 to 90/10. The preferred mixed ratio depends on the composition of a magnetic layer.

The materials for the disk cartridge used in the present invention are mainly a vinyl chloride resin for 8 inch and 5.25 inch flexible magnetic disks and an ABS resin and a polystyrene resin for a 3.5 inch flexible disk based on JIS-X-6223 and JIX-X-6224.

In the present invention, a fatty acid ester and an abrasive, as described below, having a Moh's hardness of 6 or higher are preferably added to the magnetic layer. They can improve the running durability in combination with the above mentioned prevention of mold growth.

Examples of fatty acid esters used in the present invention include butyl caprylate, ethyl laurate, butyl laurate, octyl laurate, ethyl myristate, butyl myristate, octyl myristate, ethyl palmitate, butyl palmitate, ethyl stearate, butyl stearate, octyl stearate, amyl stearate, anhydrosorbitan monostearate, anhydrosorbitan distearate, anhydrosorbitan tristearate, hexadecyl stearate, oleyl oleate, and lauryl alcohol. Of these, butyl myristate, butyl stearate, ethyl stearate, amyl stearate, hexadecyl stearate, and oleyl oleate are preferred.

The ferromagnetic powders used for the magnetic recording disk of the present invention include $\gamma$-$Fe_2O_3$, $Fe_3O_4$, $FeO_x$ (x=1.33 to 1.5), $CrO_2$, Co-containing $Fe_2O_3$, Co-containing $FeO_x$ (x =1.33 to 1.5), ferromagnetic metal powders, and tabular hexagonal ferrite powders.

Particularly, use of ferromagnetic metal powders having a small grain size and barium ferrite ferromagnetic powders, which are suitable for high density recording, can effectively produce the advantages in the magnetic recording disk. However, where the ferromagnetic powders are the ferromagnetic metal powders and barium ferrite ferromagnetic powders each having the above small grain sizes, the magnetic layer is liable to be scratched by the liner especially in the high humidity. In the magnetic recording disk of the present invention, however, such problem has been reduced.

Where the ferromagnetic powders are the ferromagnetic metal powders, the specific surface area thereof is preferably 30 to 60 $m^2/g$ and the crystallite size measured by the X-ray diffraction method is 100 to 300 Å.

Too small a specific surface area of the magnetic powders cannot sufficiently meet the requirements of high density recording, while too large a specific surface area prevents the magnetic powders from sufficiently dispersing and does not enable the smooth magnetic layer surface to be formed, which also unfavorably makes it impossible to meet the requirements of high density recording.

The tabular hexagonal ferrite powders used in the present invention have a specific surface area of 20 to 50 $m^2/g$, a tabular ratio (tabular diameter/tabular thickness) of 2 to 6 and a grain length of 0.02 to 1.0 $\mu$m.

For the same reasons as in the ferromagnetic metal powders, either too large or too small grain size thereof makes it difficult to record at a high density.

The above ferromagnetic metal powders should contain Fe. Examples thereof include the metal elements or alloys mainly composed of Fe, Fe-Co, Fe-Ni and Fe-Ni-Co.

In order t provide the magnetic recording disk of the present invention with a high density recording property, while the grain size of the ferromagnetic powders has to be small as described above, the saturation magnetization thereof is generally 110 emu/g or more, preferably 120 emu/g or more; the coercive force thereof is generally 800 Oe or more, preferably 900 Oe or more; and the axis ratio thereof is preferably 5 or more.

In order to further improve the characteristics, the nonmetallic elements such as B, C, Al, Si and P sometimes may be contained in the composition of the ferromagnetic powders. Usually, an oxide layer is formed on the surface of the above ferromagnetic metal powders for chemical stabilization.

Tabular hexagonal ferrite is a ferromagnetic powder which is tabular and has an axis of easy magnetization in the direction vertical to the plate thereof. Examples of the tabular hexagonal ferrite include barium ferrite, strontium ferrite, lead ferrite, calcium ferrite, and the cobalt-substituted compounds thereof. Of these, the cobalt-substituted compound of barium ferrite and the cobalt-substituted compound of strontium ferrite are preferred. If necessary, elements such as In, Zn, Ge, Nb and V may be added in order to improve the characteristics.

In order to provide the magnetic recording disk of the present invention with a high density recording property, while the grain size of the above tabular hexagonal ferrite powders has to be small as described above, the saturation magnetization thereof is generally 50 emu/g or more, preferably 53 emu/g or more. The coercive force thereof is generally 500 Oe or more, preferably 600 Oe or more.

The binders used for the above magnetic layer of the flexible magnetic disk include thermoplastic resins, thermosetting resins, reaction type resins, and mixtures thereof. Examples of them include, for example, a vinyl chloride-vinyl acetate copolymer, other vinyl chloride type resins, an acrylic acid ester type copolymer, a methacrylic acid ester type copolymer, a urethane elastomer, a cellulose derivative, and an epoxypolyamid resin. Various polyisocyanates are used as a hardener.

The above binders are used preferably in the amount of 5 to 300 parts by weight per 100 parts by weight of the ferromagnetic metal powders.

Further, a suitable amount of a polar functional group such as a carboxylic acid group, a sulfonic acid group, a hydroxy group, an amino group and an epoxy group is preferably introduced into molecules of the binder in order to increase the dispersing property thereof.

Compounds having various functions, such as an abrasive, a dispersant and an antistatic agent are usually added to the above magnetic layer.

In the present invention, the abrasive having a Moh's hardness of 6 or more is preferably used. Examples of the abrasive include, for example, fused alumina, silicon carbide, chromium oxide, corundum, artificial corundum, diamond, artificial diamond, garnet, and emery (the main components: corundum and magnetite). These abrasives (i.e., abrasive agents) have a Moh's hardness of 6 or more and an average particle size preferably of 0.3 to 1.0 $\mu$m, more preferably 0.4 to 0.8 $\mu$m.

These abrasives are used in the amount of generally 5 parts by weight or more, preferably 5 to 20 parts by weight and more preferably 5 to 15 parts by weight, per 100 parts by weight of the ferromagnetic powder. An amount less than the above cannot provide sufficient durability and too much decreases the filled amount of the magnetic powders, which in turn results in an insufficient output.

The following dispersant, lubricant and antistatic agent may be impregnated and adsorbed on the surfaces of the ferromagnetic powders in a solvent for the respective purposes prior to dispersing them.

Examples of the dispersants which can be used for the magnetic layer include fatty acids having 10 to 22 carbon atoms ($R_1COOH$, in which $R_1$ is an alkyl group having 9 to 21 carbon atoms), such as caprylic acid, capric acid, lauric acid, myristic acid, palmitic acid, stearic acid, oleic acid, elaidic acid, linoleic acid, linolenic acid, and stearolic acid; alkali metal (Li, Na and K) salts and alkali earth metal (Mg, Ca and Ba) salts of the above fatty acids; metallic soaps comprising Cu and Pb; and lecithin.

Additionally, higher alcohols having 4 or more carbon atoms (e.g., butanol, octyl alcohol, myristyl alcohol, and stearyl alcohol) and sulfuric acid ester thereof and phosphoric acid ester thereof can also be used.

These dispersants are used in the range of 0.005 to 20 parts by weight per 100 parts by weight of a binder. These dispersants may be deposited beforehand on the surfaces of the magnetic fine powders and non-magnetic fine powders or may be added in the middle of dispersing.

Examples of the antistatic agents used for the magnetic layer include electroconductive powders such as graphite, carbon black, and a carbon black-grafted polymer; natural surfactants such as saponin; nonionic surfactants such as an alkylene oxide type, a glycerine type, a glycidol type, a polyhydric alcohol type, a polyhydric alcohol ester type, and an alkylphenol EO adduct; cationic surfactants such as higher alkylamines, cyclic amines, hydantoin derivatives, amidoamines, esteramides, quaternary ammonium salts, pyridine and other heterocyclic compounds, phosphoniums, and sulfoniums; anionic surfactants having an acid group such as a carboxylic acid group, a sulfonic acid group, a phosphoric acid group, a sulfuric acid ester group, and a phosphoric acid ester group; amphoteric surfactants such as amino acids, aminosulfonic acids, sulfuric acid esters or phosphoric acid esters of aminoalcohols, and alkylbetains.

In the present invention, the fatty acid ester is preferably added to the magnetic layer. Additionally, one of the following compounds may be used in combination with the fatty acid ester as a lubricant: silicon oil, graphite, molybdenum disulfide, boron nitride, fluorinated graphite, fluorinated alcohol, polyolefin (polyethylene wax), polyglycol (polyethylene oxide wax), alkylphosphoric acid ester, and tungsten disulfide. However, fatty acid, fatty acid amide and an ether compound increases torque at a high temperature, and, therefore, they should be carefully used.

In the present invention, the above flexible magnetic disk comprises a magnetic layer provided on a nonmagnetic support.

The supports used for the flexible magnetic disk are films and plates of various plastics and plastics compositions including polyester such as polyethylene terephthalate and polyethylene 2,6-naphthalate, polyolefin resins such as polypropylene, cellulose derivatives such as cellulose triacetate and cellulose diacetate, vinyl type resins such as polyvinyl chloride, a polycarbonate resin, a polyamide resin, a polyimide resin, a polyamidoimide resin, a polysulfone resin, and a polyethersulfone resin.

These nonmagnetic supports may be formed in advance to the prescribed shapes, or may be formed to the prescribed shapes, for example, by cutting after coating a magnetic layer and a back layer described below. These nonmagnetic supports may be subjected to various pretreatments such as a corona discharge treatment, a plasma treatment, an undercoating treatment, a heat treatment, a metal evaporation deposition treatment, and an alkali treatment.

The above components, to which an organic solvent is added, are dispersed and mixed to prepare a magnetic coating solution, followed by coating the solution on the support and drying, whereby a magnetic layer is provided on the nonmagnetic support.

Examples of the organic solvents used for preparing the magnetic coating solution include ketones such as acetone, methyl ethyl ketone, methyl isobutyl ketone, cyclohexanone, isophorone, and tetrahydrofuran; alcohols such as methanol, ethanol, propanol, butanol, isobutyl alcohol, isopropyl alcohol, and methyl cyclohexanol; esters such as methyl acetate, ethyl acetate, butyl acetate, isobutyl acetate, isopropyl acetate, ethyl lactate, and glycol acetate, monoethyl ether; glycol ethers such as ether, glycol dimethyl ether, glycol monoethyl ether, and dioxane; aromatic hydrocarbons such as benzene, toluene, xylene, cresol, chlorobenzene, and styrene; chlorinated hydrocarbons such as methylene chloride, ethylene chloride, carbon tetrachloride, chloroform, ethylene chlorohydrin, and dicholobenzene; N,N-dimethylformaldehyde; and hexane.

Mixing is carried out by placing the magnetic powder and the above respective components into a mixer either together or separately in sequence. For example, the magnetic powder can be added to a solvent containing a dispersant and mixing is continued for a prescribed time to prepare a magnetic coating solution.

Various mixers can be used for the purpose of mixing the magnetic coating solution. Examples thereof are a two-rod roll mill, a three-rod roll mill, a ball mill, a pebble mill, a Trommel mill, a sand grinder, a Szegvari attriter, a high speed impeller disperser, a high speed stone mill, a disper, a kneader, a high speed mixer, a homogenizer, and a supersonic disperser.

The techniques regarding mixing and dispersing can be selected from the methods described in *Flowing of Dye and Pigment Dispersion* written by T. C. Patton. Two or more layers may be provided simultaneously by the simultaneous multilayer coating method.

In the present invention, the dry thickness of the magnetic layer of the flexible magnetic disk is about 0.5 to 12 $\mu$m. In the case of multilayer coating, the total thickness of the coated layers falls within the above range. This dry thickness depends on the applications, shape and specification of the magnetic recording medium.

The magnetic layer thus-coated on the non-magnetic support is subjected to a treatment for orienting the magnetic powders in the layer according to necessity, and then the formed magnetic layer is dried. If desired, the magnetic recording medium is subjected to a surface smoothing treatment, and then is cut to a prescribed form, whereby the magnetic recording disk of the present invention is prepared.

In the present invention, it has been found that the magnetic recording medium subjected particularly to the surface smoothing treatment for the magnetic layer can have a smooth surface and an excellent wear resistance. This surface smoothing treatment is carried out by a smoothing treatment before drying and by a calendering treatment after drying.

EXAMPLES

The present invention will be explained in detail with reference to the following nonlimiting examples and comparative examples. Unless otherwise indicated, amounts are in parts or % by weight.

EXAMPLE 1

The following components were mixed and kneaded with a kneader for two hours to obtain a uniform mixed dispersion.

| Components | Amount (part by weight) |
| --- | --- |
| Ferromagnetic Powder Co-substituted Ba ferrite (specific | 100 |

-continued

| Components | Amount (part by weight) |
| --- | --- |
| surface area: 35 m$^2$/g, grain length: 0.06 μm, tabular ratio: 5) | |
| Binder Resin | 10 |
| Vinyl chloride copolymer having a polar group (—SO$_3$Na group: 8 × 10$^{-5}$ equivalent/g, number average molecular weight: 75,000) | |
| Abrasive Particles | 7 |
| Al$_2$O$_3$ (average particle size: 0.3 μm) | |
| Carbon Black | |
| Ketjen Black EC (average particle size: 30 μm, manufactured by Lion Akzo Co., Ltd.) | 5 |
| Thermacs MT (average particle size: 280 μm, manufactured by Carcarb Co., Ltd.) | 2 |
| Solvent | |
| Toluene | 36 |
| Methyl ethyl ketone | 36 |

The following components were added to the mixed dispersion thus-obtained, and the mixture was further dispersed with a sand grinder at 2,000 rpm for 2 hours.

| Components | Amount (part by weight) |
| --- | --- |
| Binder Resin | 5 |
| Polyester polyurethane resin having a polar group (—SO$_3$Na group: 1 × 10$^{-4}$ equivalent/g, weight average molecular weight: 35,000) | |
| Solvent | |
| Toluene | 250 |
| Methyl ethyl ketone | 250 |

Further added to this dispersion were 6 parts by weight of polyisocanate Coronate L (manufactured by Nippon Polyurethane Co., Ltd.) and 6 parts by weight of tridecyl stearate as a fatty acid ester and were uniformly mixed, whereby the magnetic coating solution in which the ferromagnetic powders were uniformly dispersed was obtained.

This magnetic coating solution was applied on both sides of a polyethylene terephthalate film of 300 mm width and 75 μm thickness by gravure coating so that the dry thickness thereof was 2.5 μm. After drying at 100° C., the coated support was subjected to a pressure pressing treatment with a calendering roll at about 100° C., whereby the magnetic recording medium sample was obtained. Then, the magnetic recording medium was punched to 3.5 inches.

The nonwoven fabric subjected to the embossing finish and having a thickness (which is measured with a pressure of 50 g/cm$^2$) of about 220 μm (the thickness of an acrylic fiber layer: about 120 μm), in which a mixed yarn layer of a rayon (viscose rayon) fiber and a polyester (polyethylene terephthalate) fiber (mixed ratio: 5:5) was disposed on the magnetic layer side and the acrylic fiber layer on the other side (shell side, i.e., cartridge side), was prepared. The above 3.5 inch flexible magnetic recording disk was loaded in the cartridge case provided therein with the above nonwoven fabric as the liner, whereby the magnetic recording disk sample was prepared.

EXAMPLE 2

The magnetic recording disk sample was prepared in the same manner as Example 1, except that the liner was replaced with one in which an acrylic fiber layer as an inter layer was interposed between the rayon/polyester mixed yarn layer, wherein the thickness of the rayon/polyester mixed yarn layer was 50 μm and that of the inter layer of the acrylic fiber was 120 μm.

EXAMPLE 3

The magnetic recording disk sample was prepared in the same manner as Example 1, except that the mixed ratio of rayon/polyester of 5:5 was changed to 35:65.

EXAMPLE 4

The magnetic recording disk sample was prepared in the same manner as Example 1, except that in place of 6 parts by weight of tridecyl stearate, 5 parts by weight of oleyl oleate was used.

COMPARATIVE EXAMPLE 1

The magnetic recording disk sample was prepared in the same manner as Example 1, except that the liner was of the constitution in which the acrylic fiber layer was disposed on the magnetic layer side and the rayon/polyester mixed yarn layer was disposed on the shell side.

COMPARATIVE EXAMPLE 2

The magnetic recording disk sample was prepared in the same manner as Example 2, except that the ... er was of the constitution in which in place of the acrylic fiber for the inter layer, a polypropylene fiber was used for the inter layer.

COMPARATIVE EXAMPLE 3

The magnetic recording disk sample was prepared in the same manner as Example 1, except that the liner was of the constitution in which the rayon/polyester mixed yarn layer alone was provided.

Each of the magnetic recording disk samples thus-prepared was loaded and driven in the 3.5 inch floppy disk drive PD211 (manufactured by Toshiba Co., Ltd.) to carry out a 24 hour thermocycle test in which the following thermocycle flow shown in Table 1 was one cycle, with the head positioned at the track 12.

TABLE

Thermocycle Flow

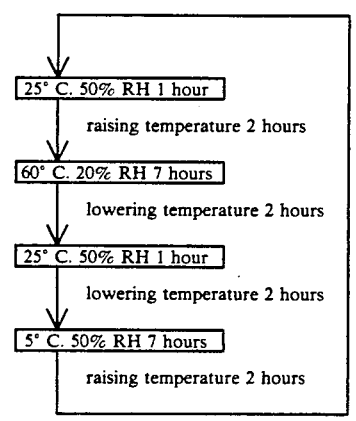

Running durability was evaluated for the magnetic recording disk samples after running them 15 million times at the above thermocycle condition.

The generation of foreign matter on the surface of the magnetic layer was evaluated in the following manner: each of the magnetic recording disk samples was allowed to stand at 23° C. and 90% RH for two weeks, and then it was stored at room temperature for three more days after the temperature thereof was back to room temperature. Then, the disk cartridge was opened and the surface of the magnetic layer of the flexible magnetic disk was observed with an optical microscope of 125 magnification to evaluate the generation of foreign matter. The evaluation results were classified as G and B, wherein G means no generation of foreign matter was observed and B means the generation of foreign matter was observed.

Further, the outputs of all trucks were measured every 500,000 passes and the output which was lowered to 45% or lower of the initial level was regarded as dropout.

The cartridge case of each of the above samples was opened after running 1,500 passes, and the surface of the magnetic layer was visually observed to evaluate the surface of the magnetic layer. The evaluation results were classified as G and B, wherein G means no change was observed on the surface of the magnetic layer, B means many fine scratches were observed on the surface thereof, and M means a few fine scratches were observed on the surface thereof.

The torque change due to humidity was measured with the 3.5 inch floppy disk drive PD211 (manufactured by Toshiba Co., Ltd.) similarly to the measurement of the running durability. A floppy disk was loaded in the floppy disk drive and was run with a head off at 23° C. and 50% RH to measure the torque loaded on the motor. Next, the atmospheric condition was changed to 23° C. and 80% RH and the torque loaded on the motor was measured as well, and the increase in the torque was obtained in terms of rate of increase.

The results thus obtained are summarized in Table 2.

TABLE 2

|  | Generation of Foreign Matter | Running Durability Dropout | Test A*1 | Test B*2 (%) |
|---|---|---|---|---|
| Example 1 | G | None | G | 13 |
| Example 2 | G | None | G | 17 |
| Example 3 | G | None | G | 14 |
| Example 4 | G | None | G | 21 |
| Comparative Example 1 | G | Occurrence after running 950 × 10$^4$ passes | B | 18 |
| Comparative Example 2 | B | Occurrence after running 300 × 10$^4$ passes | M | 15 |
| Comparative Example 3 | B | None | G | 17 |

*1:Surface of the magnetic layer after running 1,500 passes.
*2:Torque increase rate.

As is apparent from the above results, the samples of the invention prepared in Examples 1 to 4 had no generation of foreign matter attributable to the growth of molds and the running durability thereof was stable while they showed the characteristics of less increase in the torque in the high humidity.

On the other hand, in Comparative Example 1, in which the rayon/polyester mixed yarn layer and the acrylic fiber layer were reversed with respect to the magnetic layer compared with the liner layer structure of Example 1, foreign matter was not generated due to the growth of molds, but scratches were generated on the surface of the magnetic layer in measurement of the running durability; in Comparative Example 2, in which the acrylic fiber in the inter layer was replaced with the polypropylene fiber, foreign matter was generated due to the growth of molds and much dropout was caused due to dust originated from the polypropylene fiber; and in Comparative Example 3, in which no acrylic fiber was present, foreign matter was generated due to the growth of molds.

The present invention, in which the nonwoven fabric made of a rayon/polyester mixed yarn layer in the liner provided in the magnetic recording disk is provided on the side where it contacts with the magnetic layer and the nonwoven fabric made of an acrylic fiber layer is provided on the other side, can prevent molds from growing in the high humidity and improve the running durability of the magnetic recording disk.

While the invention has been described in detail and with reference to specific embodiments thereof, it will be apparent to one skilled in the art that various changes and modifications can be made therein without departing from the spirit and scope thereof.

What is claimed is:

1. A magnetic recording disk which comprises a flexible magnetic disk comprising a nonmagnetic support having thereon a magnetic layer comprising ferromagnetic powders and binders which is rotatably loaded in a cartridge having a liner formed with a nonwoven fabric on the inside of the cartridge, wherein said liner comprises (A) a layer comprising a nonwoven fabric of a mixed yarn of rayon fibers and polyester fibers formed on the side which contacts with the magnetic layer, and a layer comprising a nonwoven fabric of acrylic fibers formed on the side which contacts with the cartridge; or (B) two layers comprising a nonwoven fabric of a mixed yarn of rayon fibers and polyester fibers, and an interlayer comprising acrylic fibers formed between the two layers.

2. The magnetic recording disk as in claim 1, wherein said magnetic layer contains at least one fatty acid ester in an amount of 3 to 20 parts by weight per 100 parts by weight of the ferromagnetic powder and an abrasive agent having a Moh's hardness of 6 or more in an amount of 5 to 20 parts by weight per 100 parts by weight of the ferromagnetic powder.

3. The magnetic recording disk as in claim 2, wherein said fatty acid ester is prepared by condensing fatty acids having 6 to 22 carbon atoms with fatty alcohols having 4 to 22 carbon atoms.

4. The magnetic recording disk as in claim 1, wherein said fatty acid ester has a melting point of 30° C. or less.

5. The magnetic recording disk as in claim 1, wherein said liner has a thickness of 100 to 400 μm.

6. The magnetic recording disk as in claim 2, wherein said abrasive agent has an average particle size of 0.3 to 1.0 μm.

* * * * *